May 14, 1968     D. S. STRADER     3,382,995
MATERIAL HANDLING MACHINE
Filed July 7, 1966     7 Sheets-Sheet 2
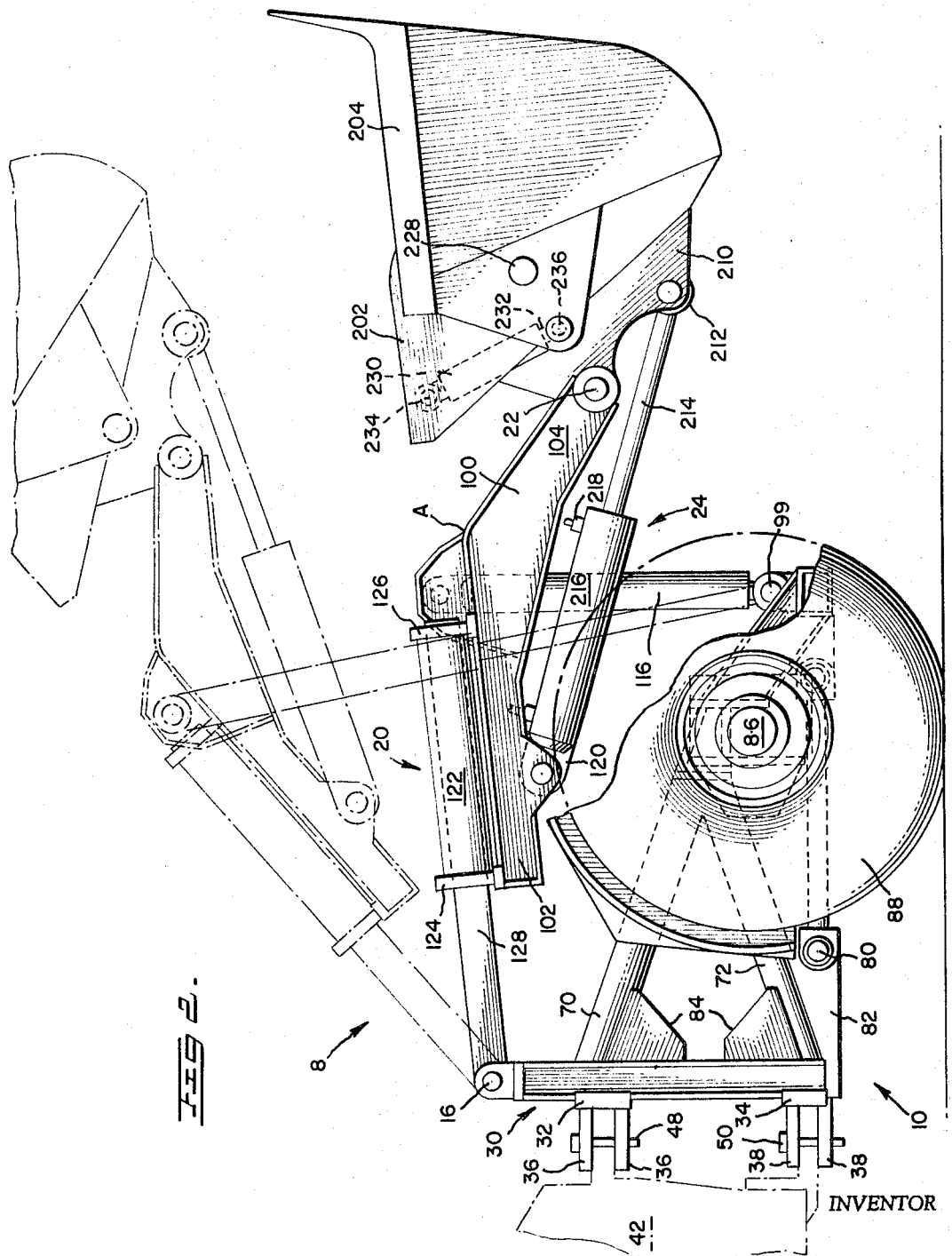
INVENTOR
DON S. STRADER
BY *Stowell & Stowell*
ATTORNEYS

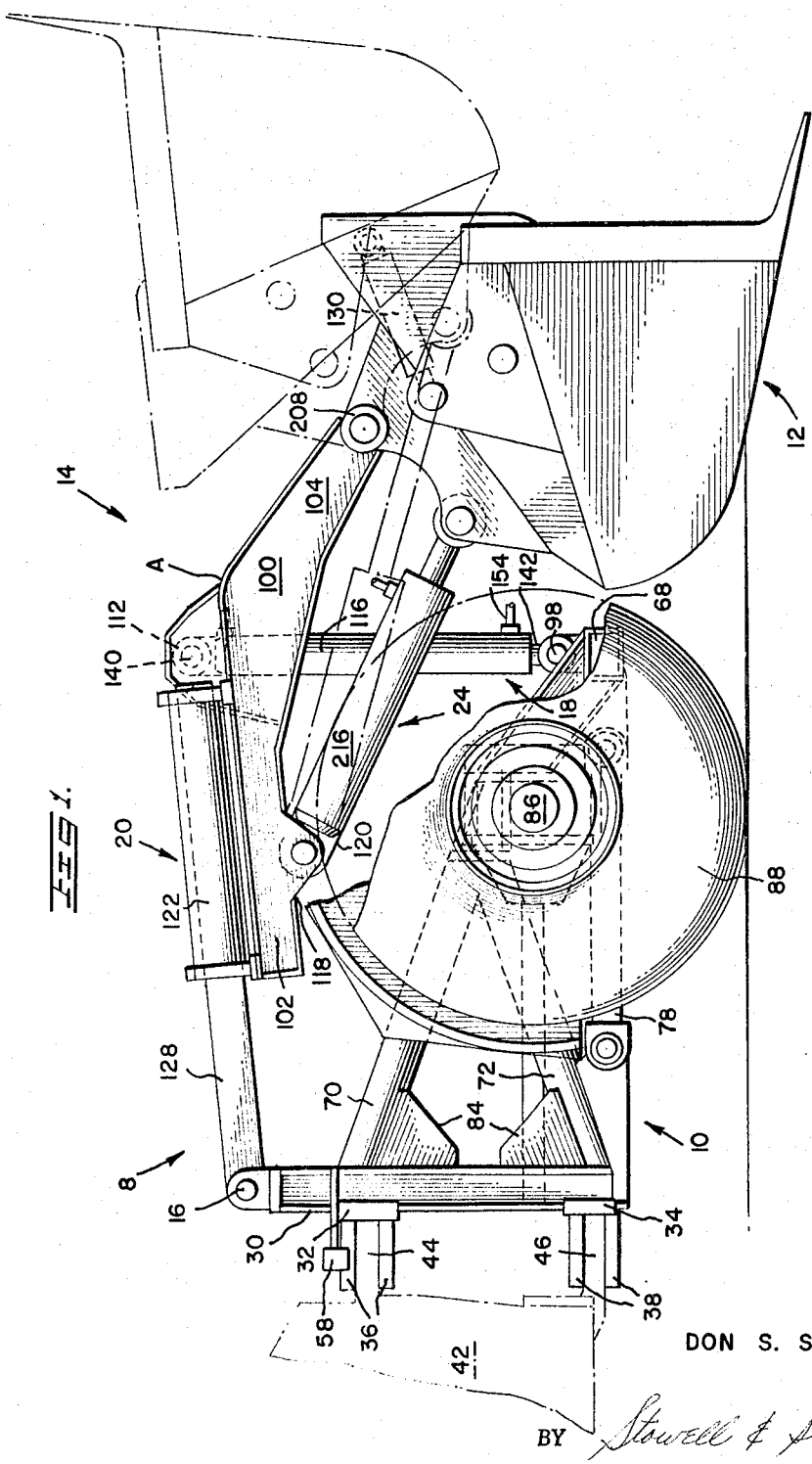

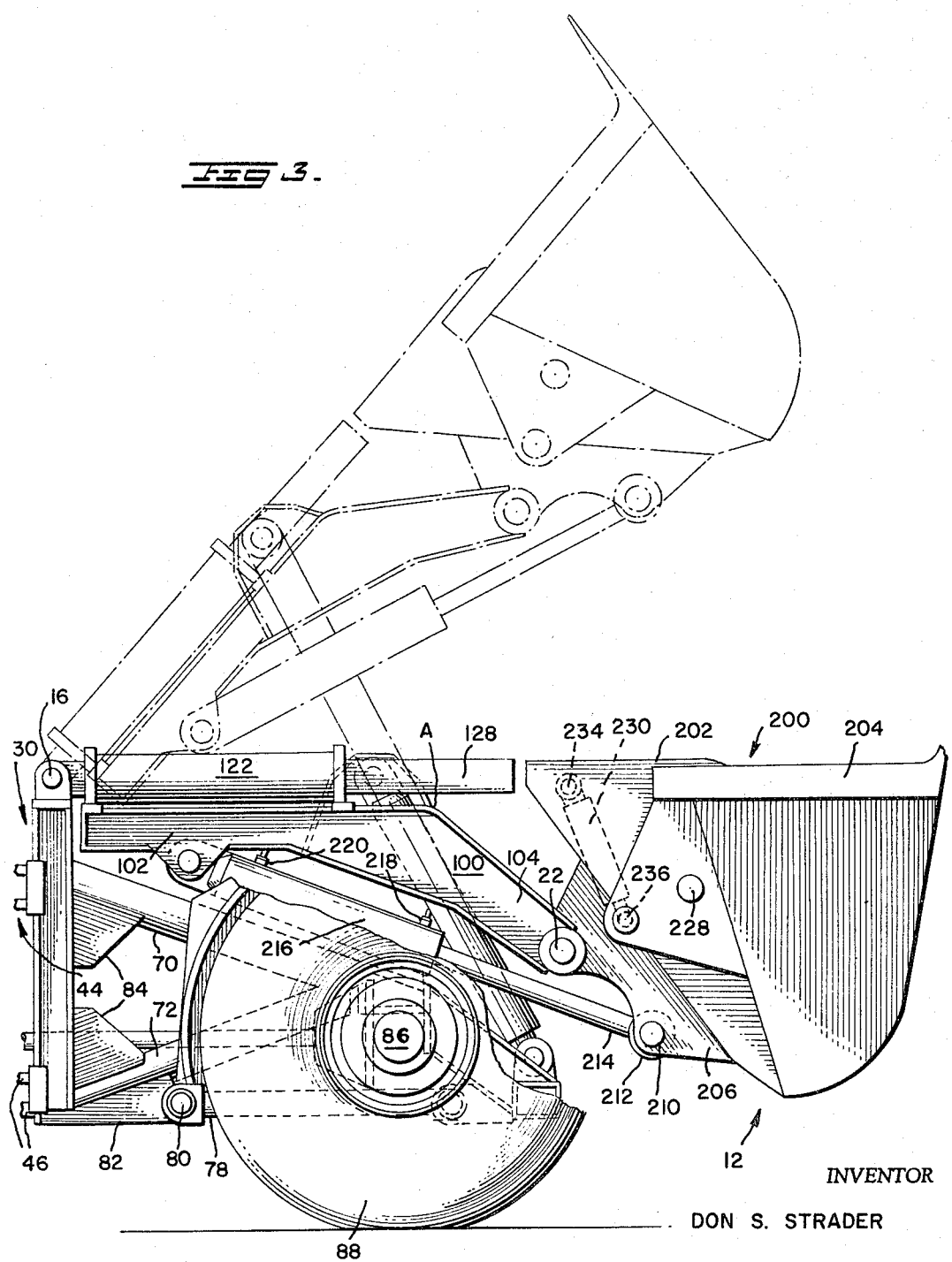

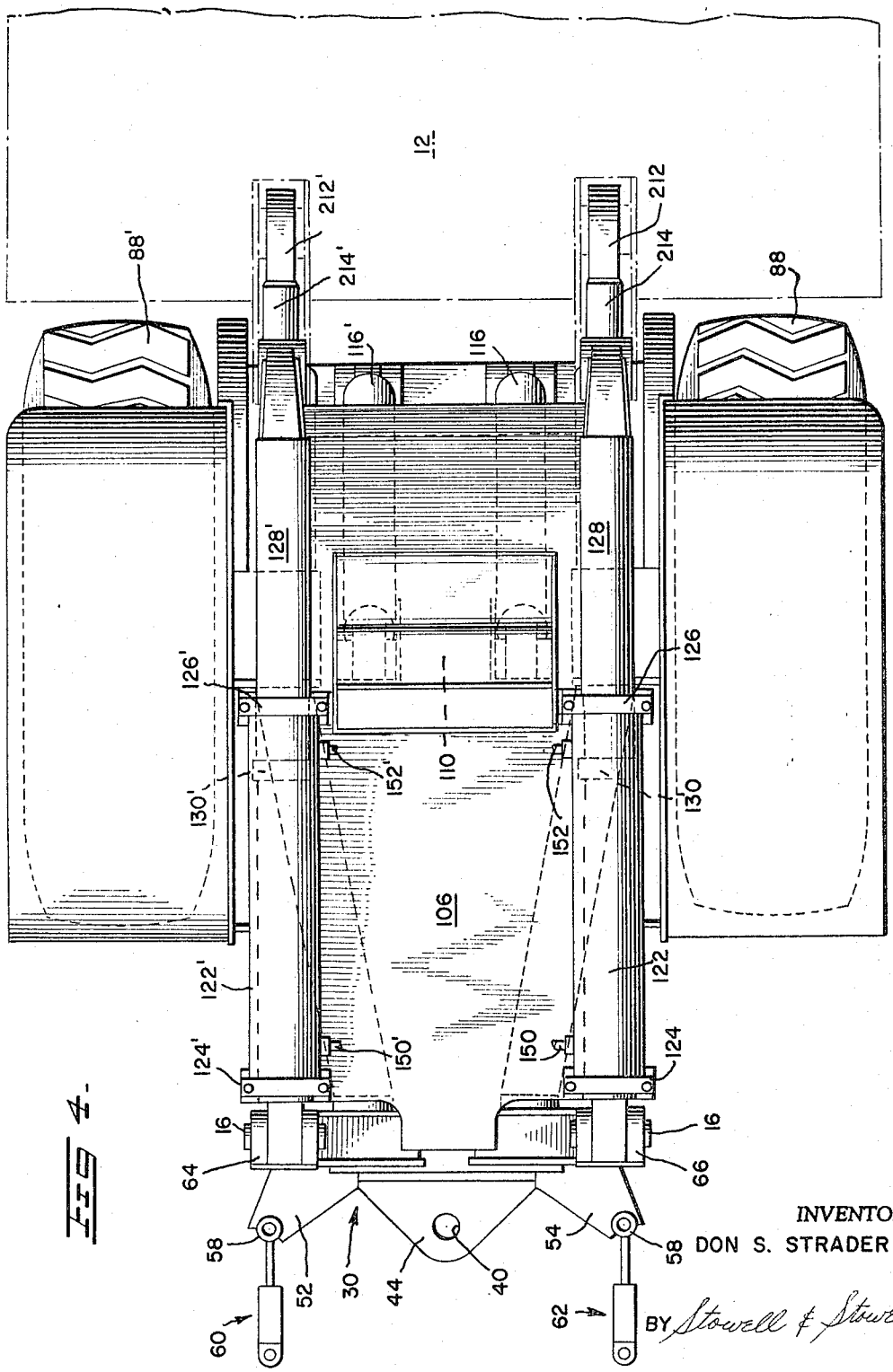

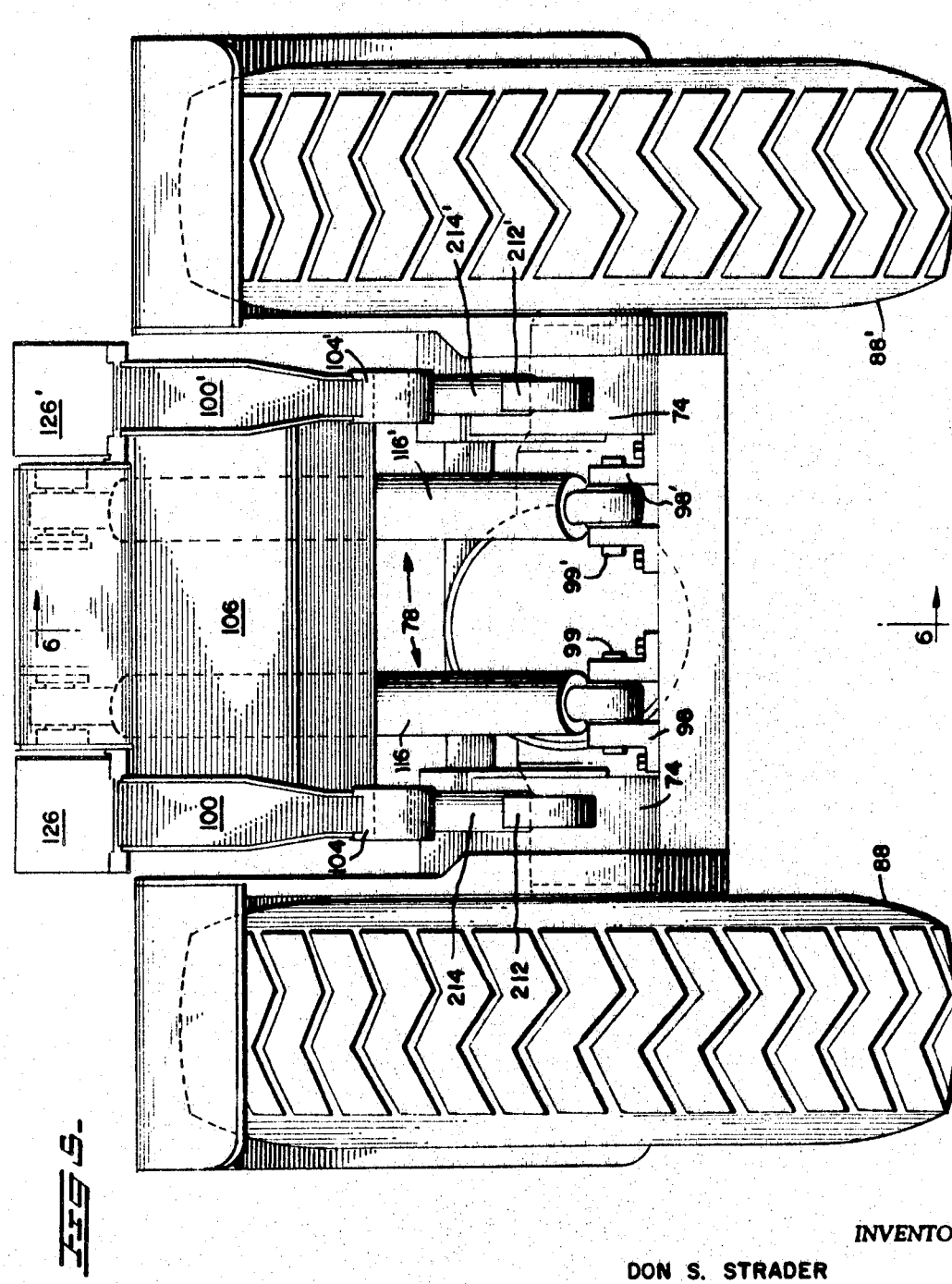

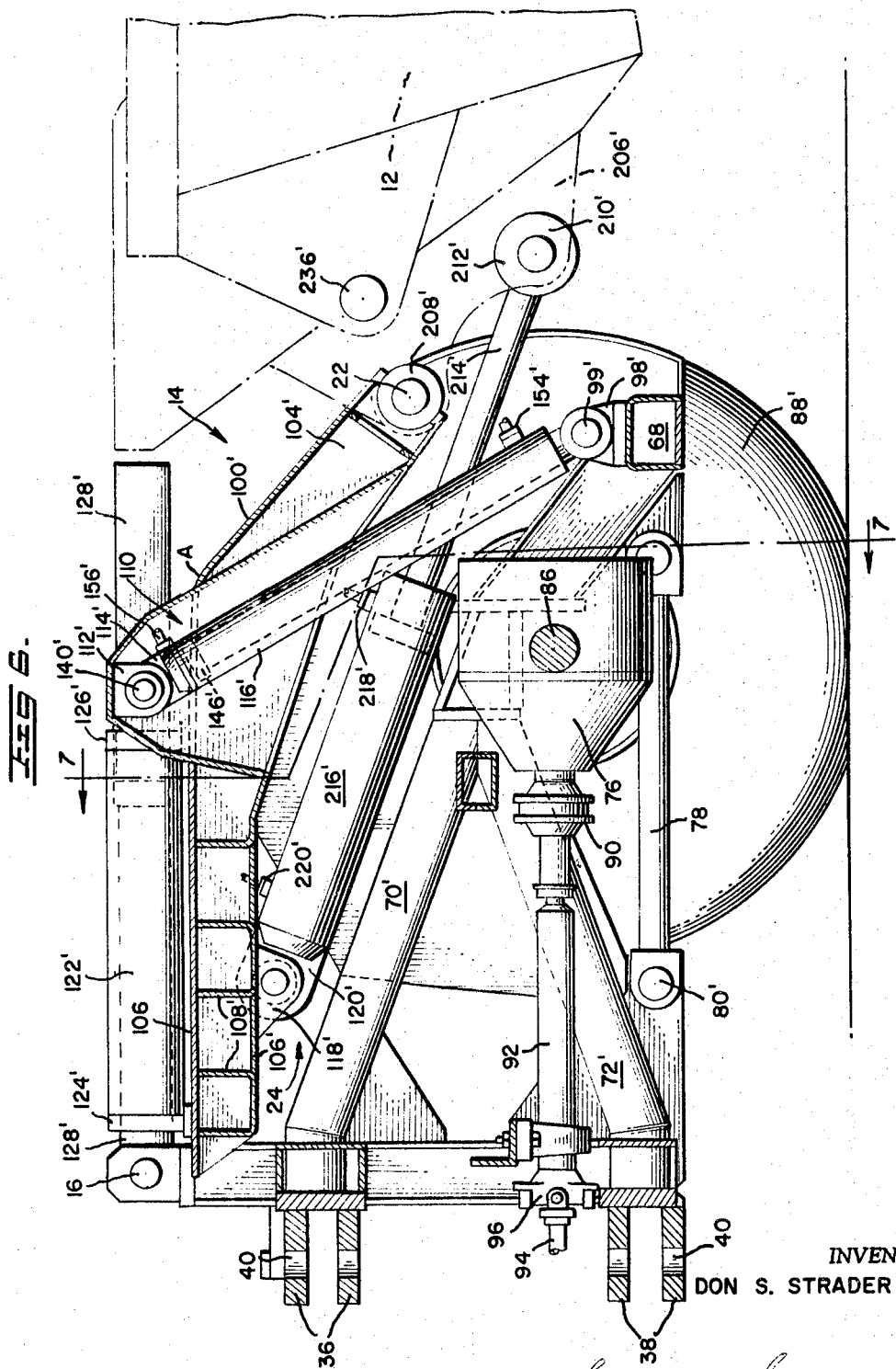

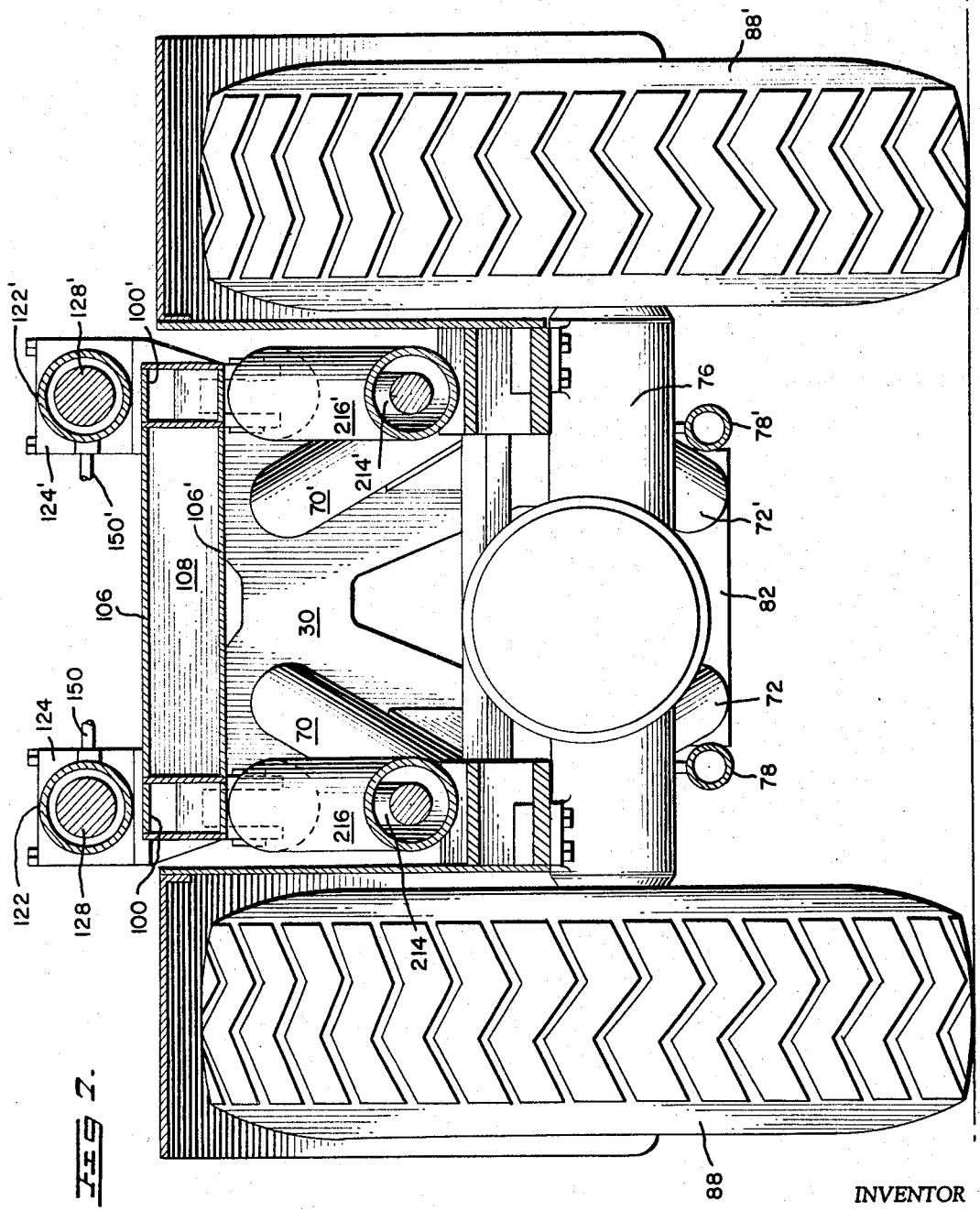

3,382,995
MATERIAL HANDLING MACHINE
Don S. Strader, Salt Lake City, Utah, assignor to The
Eimco Corporation, Salt Lake City, Utah, a corporation of Delaware
Filed July 7, 1966, Ser. No. 563,525
7 Claims. (Cl. 214—778)

ABSTRACT OF THE DISCLOSURE

A material handling machine having a carriage pivotally mounted on a frame. A material handling implement is pivotally mounted on the carriage and a cylinder and piston are extensibly connected to the mounting for sliding the carriage relative thereto. A cylinder and piston extensibly connect the carriage and the frame for pivoting the carriage about the mounting and a piston and cylinder extensibly connect the implement and the carriage for pivoting the implement relative to the carriage.

---

This invention relates to an improved material handling machine and in particular to a class of devices known as transport loaders.

It is a particular object of the present invention to provide an improved material handling machine having means, separate from the ground engaging traction means, for crowding the material handling implement into material to be loaded.

A further object of the invention is to provide such a device wherein with the material handling implement in the transport position, the primary weight of the loaded material is moved rearwardly to provide improved balance for the machine.

Another object of the present invention is to provide such a device which is powered by an external prime mover to thereby reduce to a minimum the overall size of the material handling machine.

Another object is to provide a material handling machine wherein the material handling implement is pivotally mounted on a carriage and the carriage is mounted on extensible means having pivotal connection to the main frame of the machine to thereby provide the implement with a fixed pivot point relative to the main frame of the machine.

A further object of the present invention is to provide a transport loader wherein the ways for the reciprocably mounted implement carriage comprise piston rods of hydraulic rams, the cylinders of which are mounted on the reciprocating carriage.

Other objects and advantages of the present invention will be apparent to those skilled in the art from the following detailed description of the invention when considered in light of the accompanying drawings wherein:

FIGURE 1 is a vertical view of a material handling machine constructed in accordance with the teachings of the present invention with portions broken away to more clearly illustrate the actuating mechanism for the implement supporting carriage with the implement illustrated, in full lines, in a low forward position;

FIGURE 2 is a view similar to that illustrated in FIGURE 1 with the material handling implement illustrated in full lines in a generally horizontal position and in broken lines in a raised position;

FIGURE 3 is a view similar to those shown in FIGURES 1 and 2 with the bucket illustrated in full lines in a material transport position;

FIGURE 4 is an enlarged top plan view of the machine illustrated in FIGURES 1, 2 and 3 with the carriage retracted to transport position;

FIGURE 5 is a front elevational view of the machine of the invention;

FIGURE 6 is a section on line 6—6 of FIGURE 5; and

FIGURE 7 is a section on line 7—7 of FIGURE 6.

The material handling machine 8 of the present invention generally comprises a main frame 10, a material handling implement 12, an implement supporting carriage 14, means 16 mounting the carriage to the main frame for pivotal movement about a generally horizontal axis, means 18 extensibly connecting the main frame and the carriage for pivoting the carriage about said mounting means 16, means 20 for sliding the carriage relative to said mounting means 16, means 22 pivotally mounting the implement to the carriage, and extensible means 24 operatively connected between the implement and the carriage for pivoting said implement about its pivotal mounting 22 to the carriage.

The main frame

The main frame 10 includes a generally vertically positioned rear frame member 30. Extending rearwardly from the member 30 is a pair of plates 32 and 34 each of which carries a pair of plates 36 and 38 respectively. The plates 36 and 38 are bored as at 40 as more clearly shown in FIGURE 6 of the drawings.

A prime mover carrying vehicle 42, which vehicle may comprise a conventional bulldozer or the like or a wheeled vehicle specifically designed as the power supply means for the material handling machine, is equipped with a cooperating pair of forwardly extending plate members 44 and 46 which are received between the pairs of plates 36 and 38 connected to the rear member 30 of the material handling machine. The cooperating plates 44 and 46, carried by the prime mover supporting vehicle, are also bored to receive coupling pins 48 and 50 to thereby provide a pivotal connection between the material handling machine and its source of power.

The rear plate assembly 30 also includes a pair of wing elements 52 and 54 as more clearly illustrated in, for example, FIGURE 4 of the drawings. Each wing element 52 and 54 rigidly carries a cylindrical bearing member 56 and 58 which provide means for receiving one element of one of the hydraulic rams 60 and 62 respectively. It will be appreciated that the other element of each of the hydraulic rams 60 and 62 is similarly mounted to the prime mover carrying vehicle 42 whereby when pressure fluid is directed to the ram cylinders the material handling machine 8 may be guided left or right or maintain in alignment with the prime mover suporting vehicle 42. The upper right and left ends of the rear plate assembly 30 support clevis members 64 and 66 which members are bored to receive pivot pins 16 as to be more fully described hereinafter.

The rear plate assembly 30 is connected to a front transverse beam 68 through a plurality of support members generally designated 70, 70′, 72, 72′, 74 and 74′ and a transverse transmission housing 76. Further, connections between the forward and rearward sections of the vehicle are provided by a pair of tie rods 78 and 78' which are pin connected to the forward and rearward ends of the main frame on generally horizontal axes. The rear pin connection, for the tie rod 78, is designated 80 in FIGURE 3 of the drawings. The pin 80 connects the rod 78 to the rear frame assembly 30, via a transverse bottom web 82. Also as more clearly shown in FIGURE 3 of the drawing, additional support for the bottom web 82 is provided by gusset plates such as designated 84.

The transmission housing 76 contains a pair of axles 86, one for each of the wheels 88 and 88'. The axles 86 are connected to a conventional differential means, not shown in the drawings, which differential means is provided with an input shaft 90 which in turn is connected to a rearwardly extending torque shaft 92. Shaft 92 is connected by a shaft 94 and universal joint 96 to the prime mover carried by the prime mover supporting vehicle 42; the power train being more clearly shown in FIGURE 6 of the drawings.

The front transverse beam 68 has suitably mounted thereon two pairs of bearing blocks 98 and 98' which receive pivot pins 99 and 99' for pivotally connecting one end of the carriage elevating means 18 to the main frame as to be more fully described hereinafter.

The carriage

The carriage 14 includes a pair of box-like beams 100 and 100' each of which has a generally rectlinear rear portion 102 and a generally downwardly depending forward portion 104. The box-like beams are constructed such that their cross-sectional thickness and therefore their strength is greatest adjacent point A where the generally rectlinear portion and the downwardly depending forwardly extending portion meet.

The beams 100 and 100' are interconnected by upper and lower plates 106 and 106' and a plurality of transverse web members generally designated 108 which transverse web members are more clearly seen in cross section in FIGURE 6 of the drawings. The beams 100, 100', the upper and lower plates 106, 106', and the transverse webs 108 form a very rigid carriage. Included in the carriage is a well 110 which is more clearly illustrated in FIGURES 4 and 6. At the upper end of the well 110 are mounted clevis type bearing means 112 and 112' which bearing means pivotally receive mating clevis halves 114 and 114' of their respective cylinders 116 and 116' of the ram means 18 for extensibly connecting the main frame 10 and the carriage 14 as to be more fully described hereinafter.

Further the carriage 14, has formed from each of the beams 100 and 100' clevis type bearing means 118 and 118' which clevis type bearing means pivotally receive mating bearing elements 120 and 120' associated with means 24 for moving the implement mounted on the carriage as to be more fully described hereinafter.

Mounted along the upper surface of the rectlinear portion 102–102' of each beam 100 and 100' is a fluid pressure cylinder 122 and 122' respectively. Each cylinder is provided with a pair of heads 124, 126, and 124' and 126'. Each of the heads of each of the cylinders is bored to slidably receive its respective piston rod 128 and 128'. Each piston rod has associated therewith a piston 130 and 130', shown for example in dotted lines in FIGURE 4 of the drawings. The rearward end of each of the piston rods 128 and 128' is shaped and bored to be received within the bearing means 66 and 64 respectively and maintained therein by associated pivot pins 16 also as more clearly shown in FIGURE 4 of the drawings.

The opposite end of each of the piston rods 128 and 128' is of cylindrical configuration and when the carriage 14 is in its rearward position as illustrated in FIGURE 6, the forward ends of the piston rods project beyond the more forward piston heads 126 and 126' as shown.

Since the sliding support for the entire carriage is, to a large extent, carried by the piston rods 128 and 128', in order to reduce wear on the pistons and their rods, this form of construction has been employed whereby each of the cylinders 122 and 122' has spaced sliding support on its respective piston rod.

The most forward end 104 and 104' of each of the beams 100 and 100' is shaped and bored to receive pivot pins 22, which pivot pins pivotally mount the material handling implement, generally designated 12, to the carriage.

The means for raising and lowering the carriage, or pivoting the carriage 14 about the pivot pins 16, comprise the pair of pressure fluid actuated cylinders 116 and 116' which cylinders are pivotally mounted to the carriage by pivot pins 140 and 140'. Each of the pressure fluid cylinders 116 and 116' is provided with a piston rod 142 and 142' and an associated piston. Only piston 146' is illustrated in FIGURE 6 of the drawings. The lower end of each of the piston rods 142 and 142' is shaped to be received between the pair of spaced bearing means 98 and 98' shown for example in FIGURES 5 and 6 of the drawings, which bearings 98 and 98' include pivot pins 99 and 99' hereinbefore described.

Observing for example FIGURES 1 and 6 of the drawings, it will be noted that the pressure fluid cylinders 116 and 116' connecting the main frame and the carriage are substantially vertical when the carriage is in its position of forward extension and the piston rods 142 and 142' of cylinders 116 and 116' are in telescopic relationship. However, when the carriage is in its rearward position, the cylinders 116 and 116' have a rearward slope as shown in FIGURE 6. Thus the carriage is pivoted upwardly about its pivotal connection 16 to the main frame in movement from its horizontal and rearward carrying position shown in FIGURE 6 to its digging and lifting position as shown in FIGURE 1. This relationship also prevails when the piston rods 142 and 142' are in extended relationship to their respective cylinders as illustrated in FIGURES 2 and 3 of the drawings.

Each pair of ram cylinders 122, 122' and 116 and 116' is of the double-acting type. Cylinder 122 is connected to pressure fluid via pressure fluid inlet and outlet means 150 and 152 while pressure fluid cylinder 122' has similar pressure fluid inlet and outlet means 150' and 152'. Referring specifically to FIGURES 1 and 6, pressure fluid cylinder 116 is provided with pressure fluid inlet and outlet means 154 and 156 while its related cylinder is provided with pressure fluid inlet and outlet means 154' and 156' whereby pressure fluid may be directed to either end face of the pistons therein to raise or lower the frame, or extend or retract the frame.

Material handling implement

While the machine of the present invention may support a plurality of forms of implements such as fork lifting means and log gripping and carrying means, in the illustrated form of the invention, the implement 12 comprises a bucket 200. The bucket 200 is of the front loading clam shell type and includes a rear bucket half 202 and a front bucket half 204. The rear bucket half is provided with two pairs of spaced plate members 206 and 206'. Each of the pairs of plate members 206 and 206' is provided with upper bearing means 208 and 208' which upper bearing means cooperate with pivot pins 22 to connect the rearward half of the bucket to the carriage 14. Further the pairs of plates 206 and 206' have lower bearing means 210 and 210' which cooperate with the extended ends 212 and 212' of piston rods 214 and 214' of pressure fluid cylinders 216 and 216' of means 24 which are operatively connected between the implement and the carriage 14. The cylinders 216 and 216' are also double acting and are provided with pressure fluid inlet and outlet means 218, 220 and 218' and 220' respectively whereby when pressure fluid is directed into and out of the cylinders, the implement is rocked about its pivotal connectons 22 to the carriage 14.

The forward half of the bucket 204 is pivotally mounted to the rear half 202 by a pair of pivotal connections 228 and 228'. The bucket halves are moved relative to each other about the pivotal connections 228 and 228' by a relatively small pressure fluid actuated cylinder 230 provided with a piston rod 232. The cylinder 230 is pivotally mounted, as at 234, to the rear portion 202 of the bucket while the extended end of the piston rod 232 is pivotally connected, as at 236, to the forward portion 204 of the bucket whereby when pressure fluid is directed to the end of the cylinder adjacent the pivotal connection 234, the piston rod is extended to open the bucket and when pressure fluid is directed to the opposite end, the bucket halves are pivoted together as more clearly shown in U.S. Patent application Ser. No. 563,526, Otto Puhlmann.

Operation

The prime mover supporting vehicle 42, in addition to providing the traction force for the material handling machine's wheels 88 and 88', also carries conventional means for providing pressure fluid for the plural pressure fluid rams of the material handling machine. The prime mover supporting vehicle 42 could therefore include a source of hydraulic fluid, a pump and separate control valves for the carriage extending and retracting cylinders 122 and 122', the carriage hoisting cylinders 116 and 116'; the bucket pivoting cylinders 216 and 216', and the bucket opening cylinder 230. The valves for the carriage extending and retracting cylinders would connect each of the cylinders 122 and 122' to the pump and the sump such that movement of the control valve from the neutral position to either one of two further positions would cause pressure fluid to be directed from the pump to, for example, the forward end of cylinders 122 and 122' and movement of the valve in the opposite direction would direct pressure fluid from the pump to the rearward end of said cylinders while the opposite ends are connected to the hydraulic sump. Similar valve mechanisms are employed to operate the other hydraulic rams of the material handling machine in conventional manner. A suitable system for operation of the actuating rams for the material handling machine is disclosed in United States Patent 2,982,101, owned of record by the assignee of this invention. It will also be appreciated by those skilled in the art that a more complicated control system may be mounted on the prime mover carrier vehicle 42 such that certain of the control valves would have interlock means to prevent the operator from raising the hoist cylinders 116 and 116' when the bucket 200 is in the position shown in full lines in FIGURE 1. It will be noted when the bucket is in said position clearance is not available between the rearward end of the bucket and the ground engaging traction means 88 and 88' to raise the bucket.

A cycle of operation of the improved material handling machine may comprise the following, when the material handling implement comprises a clam shell bucket such as illustrated in the drawings. From the digging position illustrated in full lines in FIGURE 1, the bucket 200 can be swung forward into the material to be loaded by actuation of the pair of bucket pivoting or swinging cylinders 216 and 216' to position the bucket in the low dump position as illustrated in full lines in FIGURE 2 of the drawings. From this position the operator can either raise the bucket 200 by extending the hoist cylinders 116 and 116' to position the bucket in the high dump position as illustrated in broken lines in FIGURE 2 or the operator can retract the bucket to the "carry" position as illustrated in full lines in FIGURE 3. It will be noted that the bucket may be dumped by actuation of the bucket-dumping cylinder 230 from either the low position illustrated in full lines in FIGURE 2 or from the high dump position illustrated in broken lines in FIGURE 2, depending on whether the material is merely to be deposited into a low vehicle or onto the surface of the ground or into a high vehicle.

It will also be noted from FIGURE 3 that the operator may retract the carriage when the bucket is in the high dump position, illustrated in broken lines in FIGURE 3, and at the same time he may rotate the bucket to a more horizontal position about its pivot 22 to the bucket carriage 14.

From the foregoing description of the preferred embodiment of the invention it will be apparent to those skilled in the art that the material handling machine fully accomplishes the aims and objects hereinbefore set forth.

It also will be apparent to those skilled in the art that various modifications may be made in the form of the device as illustrated in the drawings. For example, where desired an automatic latch mechanism may be provided on the carriage 14 to prevent the thrust loads, during loading of the bucket, from being transmitted through the piston rods 128 and 128' to the cylinders 122 and 122'. If such latch mechanism is employed electrical or hydraulic unlatching mechanisms would be coordinated with the carriage actuating valve means to automatically unlatch the carriage from the main frame during operation of the carriage cylinders.

I claim:

1. A material handling machine comprising a main frame, a material handling implement, an implement supporting carriage, means mounting the carriage to the main frame for pivotal movement about a generally horizontal axis, means for sliding the carriage relative to said mounting means, means extensibly connecting the main frame to the carriage for pivoting the carriage about said mounting means, means pivotally mounting the implement to the carriage, and extensible means operatively connected between the implement and the carriage for pivoting said implement about its pivotal mounting to the carriage.

2. A material handling machine comprising a main frame, a material handling implement, an implement supporting carriage, means for sliding the carriage relative to said main frame, said sliding means comprising a cylinder having a piston rod associated therewith, means mounting the cylinder on the carriage, means mounting the extended end of the piston rod to the main frame for pivotal movement of the carriage about a generally horizontal axis, means extensibly connecting the main frame and the carriage for pivoting the carriage about the pivotal mounting between the extended end of the piston rod and the main frame, means pivotally mounting the implement to the carriage, and extensible means operatively connected between the implement and the carriage for pivoting said implement about its pivotal mounting to the carriage.

3. The invention defined in claim 2 wherein the means extensibly connecting the main frame and the carriage and the extensible means operatively connected between the implement and the carriage comprise pressure fluid actuated piston and cylinder units.

4. A transport loader comprising a material handling machine and a prime mover vehicle, means releasably and pivotally connecting the material handling machine and the prime mover vehicle, extensible means interconnecting said material handling machine and the prime mover vehicle for varying the angular relationship between said material handling machine and the prime mover vehicle, said material handling machine including a main frame, a material handling implement, an implement supporting carriage, means mounting the carriage to the main frame of the material handling machine for pivotal movement about a generally horizontal axis, means for sliding the carriage relative to said mounting means, means extensibly connecting the main frame and the carriage for pivoting the carriage about said mounting means, means pivotally mounting the implement to the carriage, and extensible means operatively connected between the implement and the carriage for pivoting said implement about its pivotal mounting to the carriage.

5. The invention defined in claim 4 including a transverse axle mounted on said main frame of the material handling machine, a wheel mounted on each end of said axle for supporting said material handling machine, and means drivably connecting the axle of said material handling machine and the prime mover vehicle.

6. The invention defined in claim 5 wherein said means drivably connecting the axle and the prime mover vehicle includes a differential mounted on the material handling machine and associated with the said axle.

7. The invention defined in claim 1 wherein the extensible means operatively connected between the implement and the carriage for pivoting said implement about its pivotal mounting to the carriage comprises a pressure fluid cylinder having a piston rod associated therewith, means mounting one end of the cylinder to the underside of said carriage, and means mounting the piston rod to the implement below the pivotal connection between the implement and the carriage.

References Cited

UNITED STATES PATENTS

| | | | |
|---|---|---|---|
| 2,990,072 | 6/1961 | Mindrum | 214—141 X |
| 3,038,619 | 6/1962 | Wagner | 214—774 |
| 3,182,832 | 5/1965 | Bodin | 214—778 |

HUGO O. SCHULZ, *Primary Examiner.*